(12) United States Patent
Tsukagoshi et al.

(10) Patent No.: US 7,554,706 B2
(45) Date of Patent: Jun. 30, 2009

(54) HOLOGRAPHIC RECORDING METHOD, APPARATUS THEREFOR, AND HOLOGRAPHIC RECORDING AND REPRODUCING APPARATUS

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 423 days.

(21) Appl. No.: 10/572,507

(22) PCT Filed: Sep. 14, 2004

(86) PCT No.: PCT/JP2004/013378

§ 371 (c)(1), (2), (4) Date: Mar. 17, 2006

(87) PCT Pub. No.: WO2005/029202

PCT Pub. Date: Mar. 31, 2005

(65) Prior Publication Data

US 2007/0127099 A1  Jun. 7, 2007

(30) Foreign Application Priority Data

Sep. 24, 2003  (JP)  ............................. 2003-331884

(51) Int. Cl.
*G03H 1/12*  (2006.01)
*G03H 1/26*  (2006.01)

(52) U.S. Cl. .......................................... 359/11; 359/22
(58) Field of Classification Search ................... 359/10, 359/11, 15, 22, 29
See application file for complete search history.

(56) References Cited

U.S. PATENT DOCUMENTS

| 6,191,875 | B1 * | 2/2001 | Curtis et al. ................... 359/11 |
| 6,377,367 | B1 * | 4/2002 | Suganuma ...................... 359/1 |
| 6,697,180 | B1 * | 2/2004 | Wilson et al. .................. 359/11 |
| 6,909,529 | B2 * | 6/2005 | Curtis ........................... 359/30 |

FOREIGN PATENT DOCUMENTS

| JP | A 11-242424 | 9/1999 |
| JP | A-2000-268380 | 9/2000 |

OTHER PUBLICATIONS

Barbastathis et al., "Shift Multiplexing with Spherical Reference Waves," Applied Optics, vol. 35, No. 14, p. 2403-2417 (May 10, 1996).

* cited by examiner

*Primary Examiner*—Alessandro Amari
(74) *Attorney, Agent, or Firm*—Oliff & Berridge, PLC

(57) ABSTRACT

A holographic recording method and apparatus capable of performing phase code multiplex recording without employing a phase spatial light modulator. The holographic recording apparatus 10 performs phase spatial modulation of a reference beam to be projected onto a holographic recording medium by means of a phase code mask 26 in which phase code patterns are recorded in advance as a hologram and which is employed in place of a phase spatial light modulator in a reference optical system 20.

11 Claims, 8 Drawing Sheets

US 7,554,706 B2

HOLOGRAPHIC RECORDING METHOD, APPARATUS THEREFOR, AND HOLOGRAPHIC RECORDING AND REPRODUCING APPARATUS

TECHNICAL FIELD

The present invention relates to a holographic recording method for recording interference fringes by projecting an object beam and a reference beam onto a holographic recording medium, to an apparatus therefor, and to a holographic recording and reproducing apparatus.

BACKGROUND ART

When phase code multiplex recording is performed in such a type of conventional holographic recording method or in a conventional holographic recording and reproducing apparatus, a reference beam is subjected to phase spatial modulation by means of a phase spatial light modulator to thereby form a phase code pattern, which is then projected onto a holographic recording medium together with an object beam subjected to amplitude spatial light modulation according to the information to be recorded, thereby forming interference fringes.

DISCLOSURE OF THE INVENTION

As mentioned above, when the phase code multiplex recording is performed in the conventional holographic recording method, the phase spatial light modulator must be provided in a reference optical system, thereby causing a problem that the holographic recording apparatus becomes large and expensive.

The present invention has been made in view of the above problem, and it is an object of the invention to provide a holographic recording method which enables phase code multiplex recording without employing an expensive and large phase spatial light modulator and to provide an apparatus therefor and a holographic recording and reproducing apparatus.

The present inventor has conducted extensive studies and consequently found that by employing a phase code mask in place of a phase spatial light modulator the phase code multiplex recording can be achieved without increasing the size and the cost of a holographic recording apparatus.

In summary, the above-described objectives are achieved by the following aspects of the present invention.

(1) A holographic recording method comprising: branching a laser beam into a reference beam and an object beam; guiding the reference beam to a reference optical system, and at the same time guiding the object beam to an object optical system; phase-spatial-modulating the reference beam in the reference optical system; amplitude-spatial-modulating the object beam in the object optical system; and projecting each of the beams onto a holographic recording medium to thereby record interference fringes, wherein the reference beam is phase-spatial-modulated in the reference optical system by means of a phase code mask in which a required phase code pattern is recorded as a hologram in advance.

(2) A holographic recording apparatus, comprising: a laser beam source; a reference optical system which guides one of branched laser beams resulting from branching a laser beam from this laser beam source to a holographic recording medium as a reference beam; an object optical system which guides the other of the branched laser beams to the holographic recording medium as an object beam; a phase code mask which is arranged in the reference optical system, has a required phase code pattern recorded as a hologram in advance, and phase-spatial-modulates the reference beam; and an amplitude spatial light modulator which is arranged in the object optical system and amplitude-spatial-modulates the object beam according to information to be recorded, wherein the phase-spatial-modulated reference beam and the amplitude-spatial-modulated object beam are projected onto the holographic recording medium to thereby perform holographic recording of the information.

(3) The holographic recording apparatus according to (2), wherein the phase code pattern is angle-multiplex-recorded in the phase code mask.

(4) The holographic recording apparatus according to (3), comprising an angle modulator which modulates at least one of an angle of the phase code mask with respect to the laser beam and an incident luminous intensity of the laser beam on the phase code mask.

(5) The holographic recording apparatus according to (2), wherein the phase code pattern is spherical-shift-multiplex-recorded in the phase code mask.

(6) The holographic recording apparatus according to (5), comprising a mask driving device which translationally moves the phase code mask in a direction orthogonal to the incident laser beam.

(7) The holographic recording apparatus according to any one of (2) to (6), comprising a beam expander which expands a beam diameter of the laser beam from the laser beam source, and wherein: the phase code mask serves as means which branches the laser beam having the expanded beam diameter; and a diffraction beam of the laser beam in the phase code mask serves as the reference beam, and a transmission beam thereof serves as the object beam.

(8) A holographic reproducing apparatus, comprising: a phase code mask which has a phase code pattern recorded as a hologram and phase-modulates a projected laser beam by use of the phase code pattern; a laser beam source; a beam expander which expands a beam diameter of a laser beam from the laser beam source; a reference optical system which projects the laser beam having the expanded beam diameter onto the phase code mask and guides a diffraction beam thereof to a holographic recording medium; a Fourier lens disposed after the phase code mask in the reference optical system; and a CCD which receives the diffraction beam formed from a reference beam projected onto the holographic recording medium to thereby reproduce information, wherein the information is phase-code-multiplex-recorded in the holographic recording medium in advance so as to correspond to the phase code pattern of the phase code mask.

(9) The holographic reproducing apparatus according to (8), wherein: the phase code pattern is multiplex-recorded in the phase code mask and the information is phase-code-multiplex-recorded in the holographic recording medium; and the phase code mask is configured to be controllable by means of a mask driving device such that one of the recorded phase code patterns is recreated.

(10) A holographic recording and reproducing apparatus, comprising: a laser beam source; a beam expander which expands a beam diameter of a laser beam from the laser beam source; a polarizing beam splitter which splits the laser beam having the expanded beam diameter into two linearly polarized beams having orthogonal vibration planes; a reference optical system which guides one linearly polarized beam branched by means of the polarizing beam splitter to a holographic recording medium; an object optical system which guides the other linearly polarized beam to the holographic recording medium; a ½ wave plate, a phase code mask, and a Fourier lens which are arranged in the reference optical system in order from the side of the polarizing beam splitter; a mask driving device which drives the phase code mask; and an amplitude spatial light modulator and a Fourier lens which are arranged in the object optical system in order from the side of the polarizing beam splitter, wherein: the phase code mask has the phase code pattern multiplex-recorded as a hologram and is configured to phase-modulate the projected reference beam by means of the phase code pattern; the amplitude spatial light modulator is configured to amplitude-modulate the object beam according to information to be recorded; and the phase-modulated reference beam and the amplitude-modulated object beam are projected onto the holographic recording medium to thereby phase-code-multiplex-record the information through interference fringes of the reference beam and the object beam.

In the present invention, a phase code mask is employed in place of a phase spatial light modulator, whereby the holographic recording apparatus can be made compact at low cost.

BEST MODE FOR CARRYING OUT THE INVENTION

Figure 1:
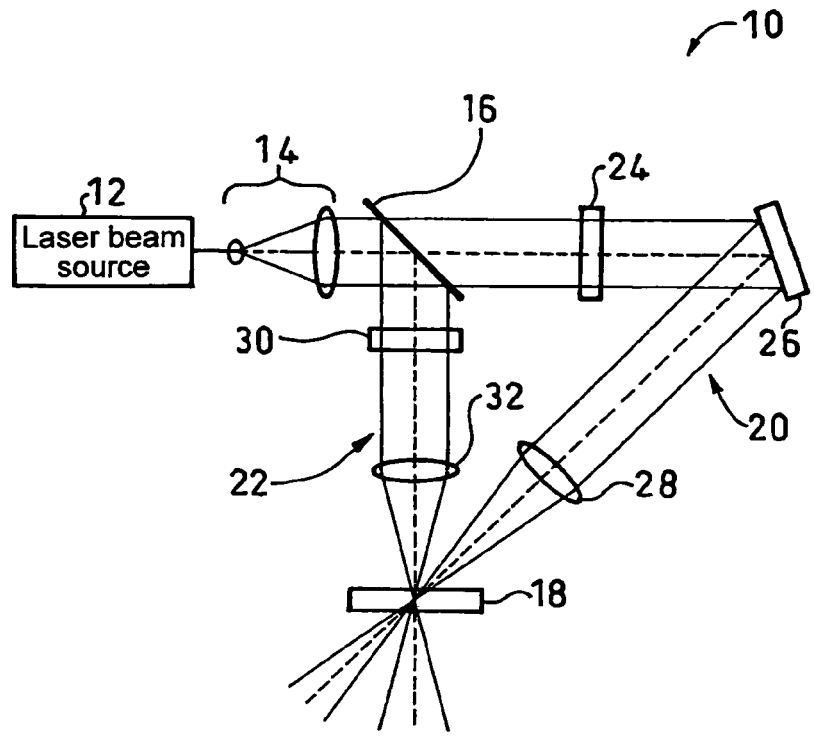
FIG. 1 is an optical system diagram illustrating a holographic recording apparatus according to a first embodiment of the invention.

The abovementioned object is achieved by arranging, in a reference optical system of a holographic recording system, a phase code mask in which required phase code patterns are recorded in advance as a hologram to thereby subject a reference beam to phase spatial modulation.

First Embodiment

A first embodiment of the present invention will next be described with reference to FIG. 1.

A holographic recording apparatus 10 according to the first embodiment includes: a laser beam source 12; a beam expander 14 which expands the beam diameter of the laser beam emitted from the laser beam source 12 to form a collimated laser beam; a polarizing beam splitter 16 which splits the laser beam having the beam diameter expanded by this beam expander 14 into two linearly polarized beams having orthogonal vibration planes; a reference optical system 20 which guides one linearly polarized beam having passed through this polarizing beam splitter 16 to a holographic recording medium 18; and an object optical system 22 which guides the other linearly polarized beam having been reflected from the abovementioned polarizing beam splitter 16 to the abovementioned holographic recording medium 18.

In the abovementioned reference optical system 20, a ½ wave plate 24, a phase code mask 26, and a Fourier lens 28 are arranged in this order from the side of the abovementioned polarizing beam splitter 16.

Further, in the abovementioned object optical system 22, an amplitude spatial light modulator 30 and a Fourier lens 32 are arranged from the side of the polarizing beam splitter 16.

In the abovementioned phase code mask 26, phase code patterns are hologram-recorded by, for example, angle multiplex recording or spherical shift multiplex recording, as will be described hereinafter. When an unmodulated reference beam is projected on the phase code mask 26, this reference beam is phase-modulated by diffraction and is projected onto the holographic recording medium 18 via the Fourier lens 28.

Therefore, this holographic recording apparatus 10 can perform phase code recording without employing an expensive and large phase spatial light modulator.

In FIG. 1, the phase code mask 26 is a reflection type which emits a diffraction beam as a reflection beam, but the present invention is not limited thereto. The phase code mask 26 may be a transmission type.

Next, with reference to FIG. 2, a description will be given for the case where the information holographically recorded in the holographic recording medium 18 by the abovementioned holographic recording apparatus 10 is reproduced.

Figure 2:
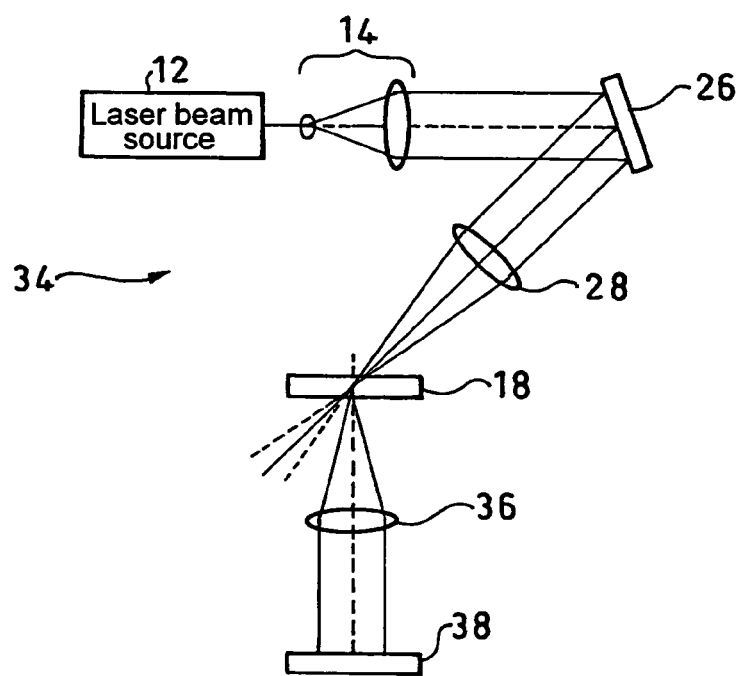
FIG. 2 is an optical system diagram illustrating a holographic reproducing apparatus of the first embodiment.

In FIG. 2, the same numerals designate the same components as in FIG. 1, and the descriptions will be omitted.

A holographic reproducing apparatus 34 has: a reference optical system 20 having a configuration in which the ½ wave plate 24 in the holographic recording apparatus 10 of FIG. 1 is removed; and a CCD 38 which receives, via an imaging lens 36, the diffraction beam generated in the holographic recording medium 18.

In this holographic reproducing apparatus 34, after the beam diameter of the laser beam for reproduction is expanded by the beam expander 14, the beam is phase-modulated by the phase code mask 26 and is reflected therefrom. This beam then converges with the phase modulation pattern thereof Fourier-transformed by the Fourier lens 28 and is projected onto the holographic recording medium 18.

In this holographic recording medium 18, a hologram utilizing the abovementioned phase modulation pattern as addresses is recorded, and data emerges as a diffraction image (a reproduction image) by irradiation with the laser beam for reproduction (the reference beam). The reproduction image is formed on the light receiving surface of the CCD 38 through the imaging lens 36, and the CCD 38 detects, processes the detected signals, and decodes the reproduction image to thereby reproduce the data.

Second Embodiment

Next, a holographic recording apparatus 40 according to a second embodiment of the present invention will be described with reference to FIGS. 3 and 4.

This holographic recording apparatus 40 employs a phase code mask 42 in which phase code patterns are shift-multiplex-recorded.

Among the components of this holographic recording apparatus 40, the same components as those constituting the abovementioned holographic recording apparatus 10 are designated by the same numerals as those in FIG. 1, and the descriptions will be omitted.

Figure 3:
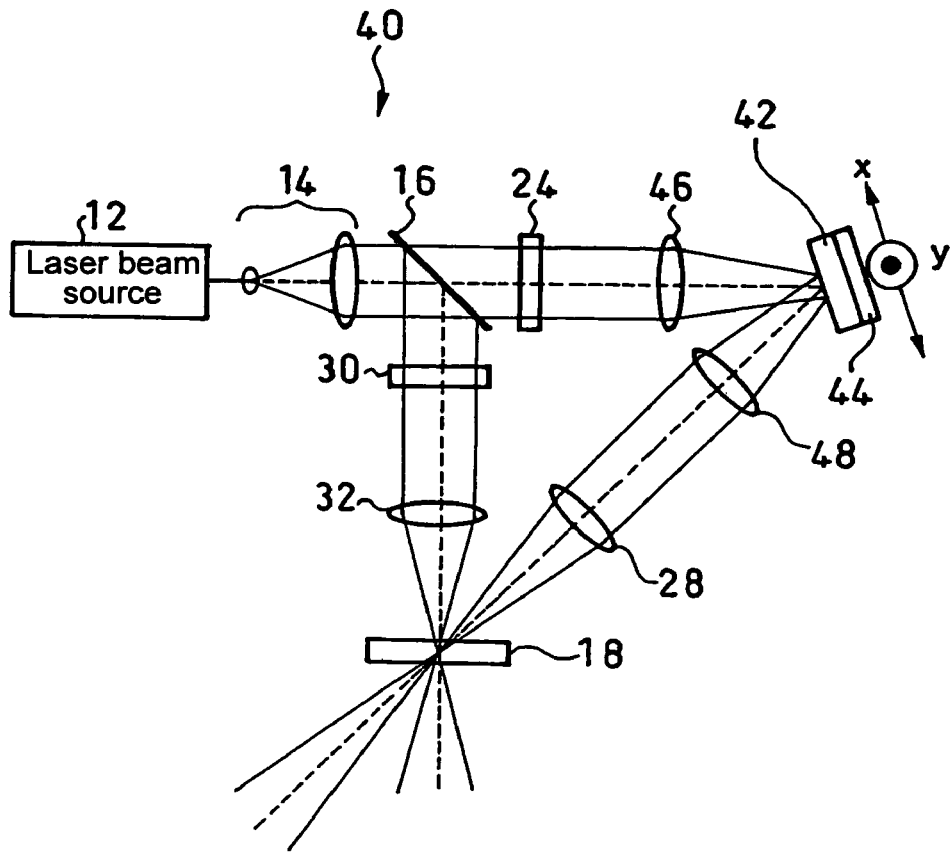
FIG. 3 is an optical system diagram illustrating a holographic recording apparatus according to a second embodiment.
Figure 4:
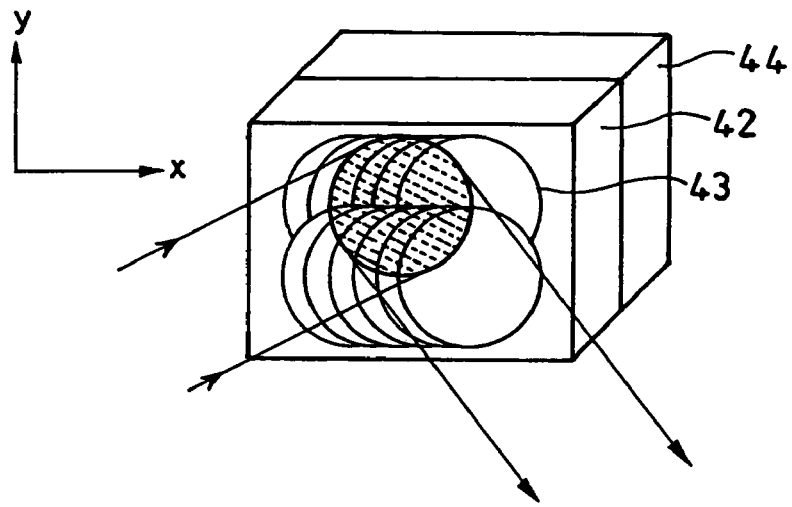
FIG. 4 is a perspective view schematically illustrating a phase code mask and a mask driving device for translationally moving the mask in the second embodiment.

In this holographic recording apparatus 40, the abovementioned phase code mask 42 is supported by a translating device 44 serving as a mask driving device so as to be translationally movable in the directions indicated by symbols X and Y in FIGS. 3 and 4.

Further, in this holographic recording apparatus 40, the laser beam passing through the ½ wave plate 24 is condensed in the phase code mask 42 by a condensing lens 46. In addition, the diffraction beam (the reflection beam) from the phase code mask 42 is transformed into a collimated beam by an imaging lens 48 and is incident on the holographic recording medium 18 via the abovementioned Fourier lens 28. The other configurations are the same as those of the holographic recording apparatus 10 shown in FIG. 1.

As shown in FIG. 4, in the inside of the abovementioned phase code mask 42, many phase code patterns are recorded in advance as a hologram 43. Therefore, the reference beam projected onto the phase code mask 42 through the condensing lens 46 is diffracted (reflected) by the phase code mask 42, whereby the reference beam is phase-modulated by any reproduction pattern among the abovementioned recorded phase code patterns.

On the other hand, the information (data) to be recorded is imparted to the object beam by means of the amplitude spatial light modulator 30, and thereby so-called phase code multiplex recording is achieved by recording the interference fringes with the abovementioned phase-modulated reference beam in the holographic recording medium 18.

Therefore, in this holographic recording apparatus 40, the phase code mask 42 is translationally moved in the X and Y directions by means of the mask driving device 44 to sequentially change the phase modulation pattern, whereby different data patterns can be multiplex-recorded in the same position in the holographic recording medium 18 as in conventional phase code multiplex recording.

Similarly, upon information reproduction, the desired phase code pattern is invoked by means of the translational motion of the phase code mask 42, and the reference beam modulated by this code pattern is projected onto the holographic recording medium 18 in which the abovementioned phase code patterns are multiplex-recorded, whereby the information desired to be reproduced can be called up.

That is, in this holographic recording apparatus 40, the recording and reproducing principle is that of the phase code multiplex recording, but the mechanical access method is equivalent to that of the shift multiplex recording. In other words, this holographic recording apparatus 40 can be regarded as a system which converts the action of the shift multiplex recording to the phase code multiplex recording.

The holographic recording can be performed on the holographic recording medium 18 by means of the holographic recording apparatus 40 according to the second embodiment. Therefore, the phase code multiplex recording excellent in recording characteristics can be achieved without employing a high cost and large phase spatial light modulator.

Further, the second embodiment can provide an advantage that the dimensions and the functions of the phase code mask 42 serving as phase modulation means can be restricted in accordance with the total number of required phase code patterns (hereinafter, referred to as the number of codes).

On the other hand, in conventional phase code multiplex recording, an electronically controlled phase spatial light modulator has been employed in which the number of total pixels is fixed irrespective of whether the number of codes is large or small. In addition, when restriction is imposed on the number of pixels employed, a method has been employed, for example, in which a pixel block formed of a plurality of pixels is regarded as one pixel. This is a waste of functions, and the presence itself of the pixel boundary regions in the pixel block may cause noise in the modulation pattern. According to the present invention, the modulation can be performed by use of any number of pixels, and the maximization of diffraction efficiency and the minimization of the device dimensions may be achieved by recording the minimum number of required codes.

Next, the manufacturing process of the phase code mask employed in each of the abovementioned embodiments will be described.

Figure 5:
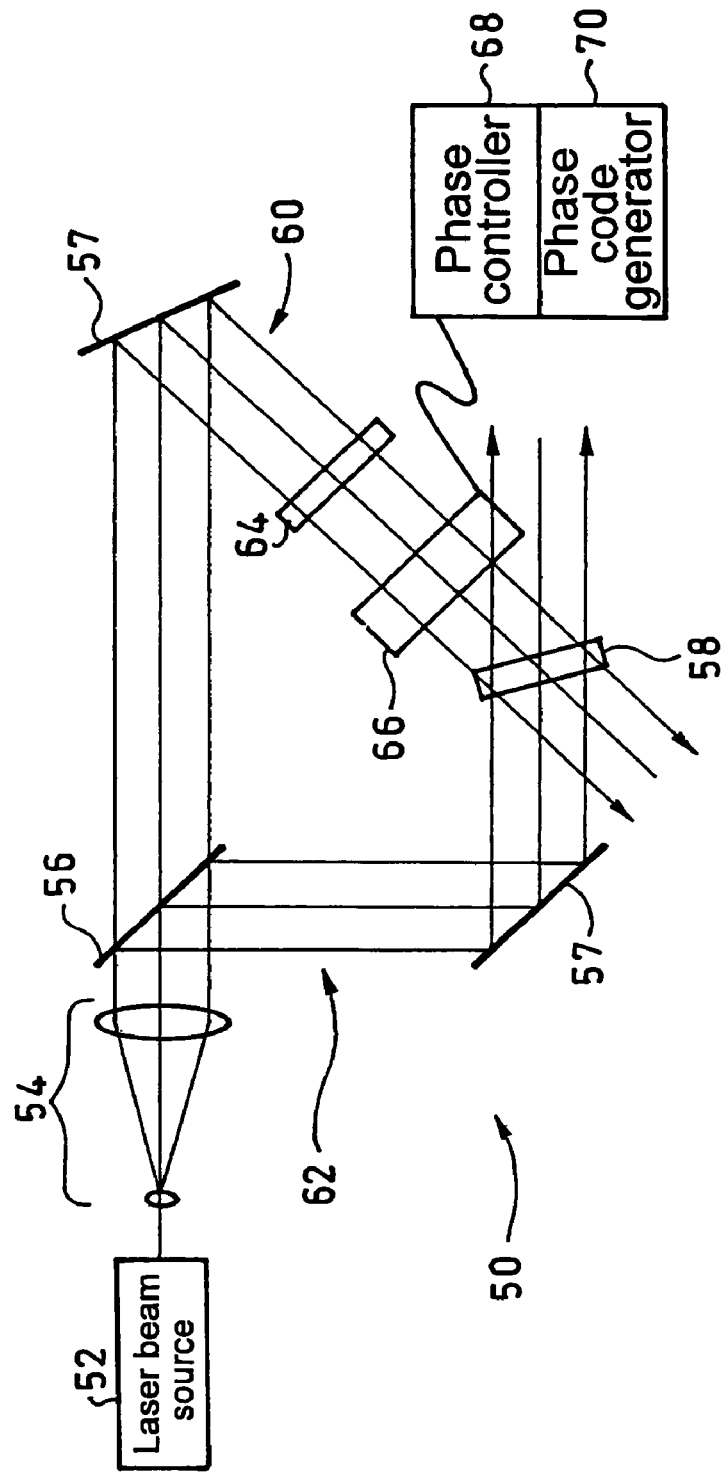
FIG. 5 is an optical system diagram, including a partial block diagram, illustrating a phase code mask manufacturing apparatus for manufacturing the abovementioned phase code mask.

FIG. 5 illustrates a code mask manufacturing apparatus 50 for a reflection type code mask. This code mask manufacturing apparatus 50 includes: a laser beam source 52; a beam expander 54 which is similar to the abovementioned beam expander 14 as shown in FIGS. 1 and 2; a polarizing beam splitter 56 for splitting a collimated laser beam having a beam diameter expanded by the beam expander 54 into two linearly polarized beams having orthogonal vibration planes; a reference optical system 60 for guiding one linearly polarized beam having passed through this polarizing beam splitter 56 to a phase code mask material 58; an object optical system 62 for guiding the other linearly polarized beam having reflected from the abovementioned polarizing beam splitter 56 to the abovementioned phase code mask material 58 from the side opposite to the abovementioned reference optical system 60; and a ½ wave plate 64 and a phase spatial light modulator 66 which are arranged in the abovementioned reference optical system 60 in this order from the side of the polarizing beam splitter 56. The numeral 57 designates a total reflection mirror.

The abovementioned phase spatial light modulator 66 is configured to phase-modulate the reference beam in accordance with the phase code output from a phase code generator 70 via a phase controller 68.

Figure 6:
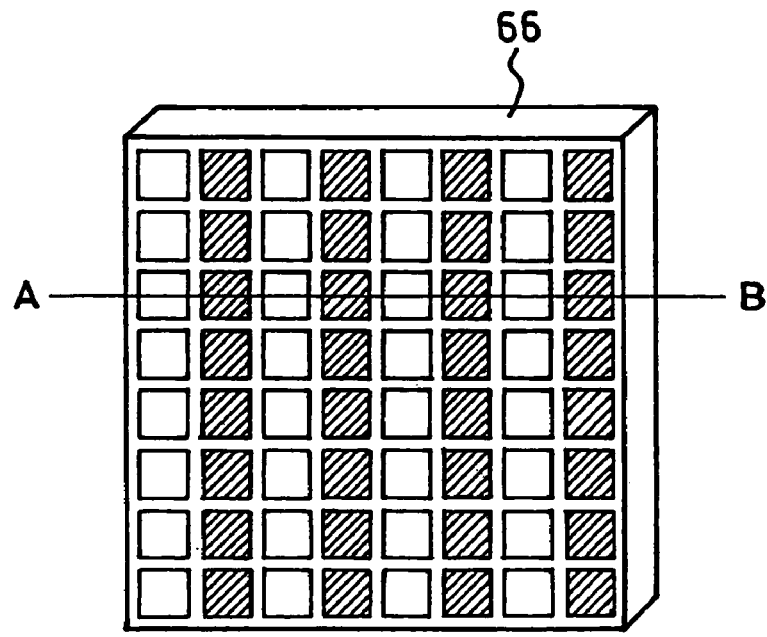
FIG. 6 is a perspective view schematically illustrating a phase code pattern in a phase spatial light modulator employed in the code mask manufacturing apparatus.

The abovementioned laser beam source 52 is a high coherence beam source such as a He-Ne laser or a Nd:YAG laser. An example of the phase modulation pattern displayed on the abovementioned phase spatial light modulator 66 is shown in FIG. 6. This phase modulation pattern is generated by the phase code generator 70 and is optically or electrically transmitted to the phase spatial light modulator 66 through the abovementioned phase controller 68.

A phase modulation state, for example, as shown in FIG. 6, in the abovementioned phase spatial light modulator 66 will be described. In this case, modulation by means of one-dimensional eight-pixel Walsh-Hadamard codes is employed as an example, but two-dimensional modulation or modulation by use of other encoding codes may be employed in accordance with the required characteristics of holographic recording.

Figure 7:
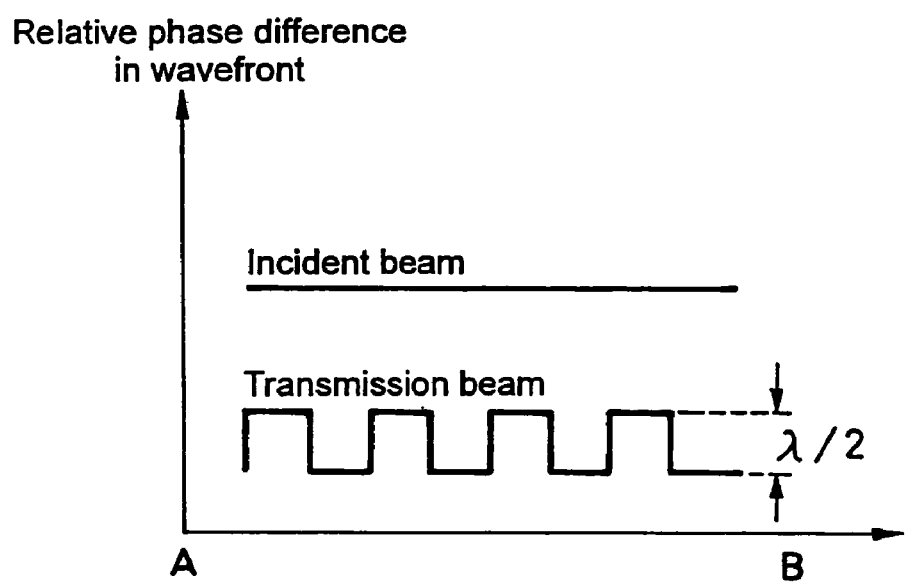
FIG. 7 is a diagram showing the relative phase difference in wavefront between an incident beam and a transmission beam in the phase code pattern.

As shown in FIG. 7, a phase difference corresponding to λ/2 or ½ of the wavelength (π in the phase) is generated between a white pixel and a diagonally shaded pixel shown in FIG. 6. Further, the modulation of gray scale may be performed by setting the minimum phase difference to π/2, π/4, or the like.

In this code mask manufacturing apparatus 50, after the beam diameter of the laser beam from the laser beam source 52 is expanded by the beam expander 54, this laser beam is branched into a p-polarized beam which passes through the polarizing beam splitter 56 and an s-polarized beam which is reflected therefrom. The p-polarized beam serving as a transmission beam is reflected from the mirror 57 and is then converted to an s-polarized beam by the ½ wave plate 64. This beam is phase-modulated according to the phase modulation pattern displayed on the phase spatial light modulator 66 upon transmission through the phase spatial light modulator 66 and is projected onto the phase code mask material 58.

On the other hand, the s-polarized beam serving as a reflection beam of the abovementioned polarizing beam splitter 56 is reflected from the mirror 57 and is projected onto the abovementioned phase code mask material 58 from the side opposite to that of the reference light phase-modulated by the abovementioned phase spatial light modulator 66.

In this manner, optical interference fringes caused by the interference between the two s-polarized beams are generated in the phase code mask material 58 and recorded therein.

The thus-manufactured phase code mask emits a phase-modulated reference beam as a diffraction beam when an unmodulated beam is projected there onto from the left in FIG. 5.

The manner in which the phase codes are recorded in the abovementioned phase code mask material 58 through the reference beam and the object beam will be described in more detail with reference to FIG. 8.

Figure 8:
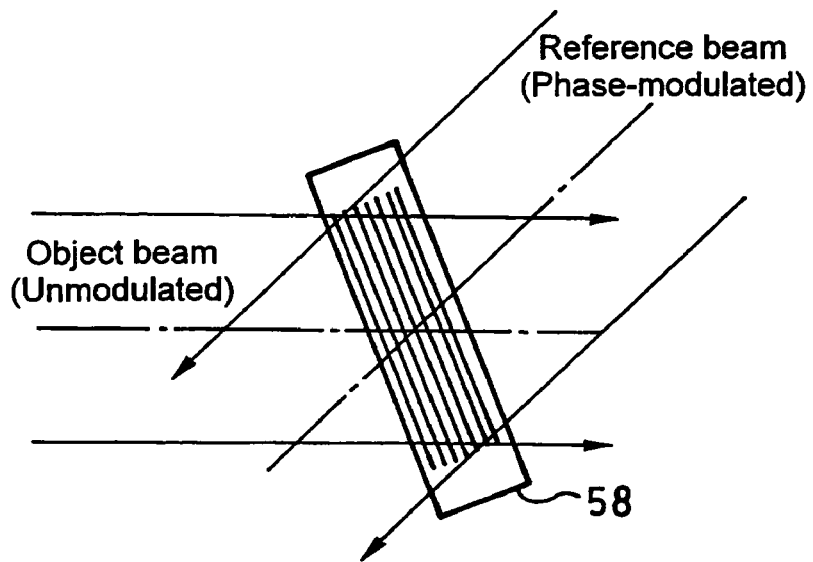
FIG. 8 is a cross-sectional view schematically illustrating a reference beam, an object beam, and interference fringes when the phase code mask is manufactured.

As shown in FIG. 8, the interference fringes caused by the unmodulated object beam incident on the phase code mask material 58 from the left and the phase-modulated reference beam incident thereon from the upper right are recorded in the phase code mask material 58.

Since the abovementioned reference beam is phase-modulated by means of the abovementioned phase spatial light modulator 66 by use of patterns representing the phase codes generated by the phase code generator 70, the phase codes are multiplex-recorded in the recorded interference fringes as a diffraction grating (a volume hologram).

Figure 9:
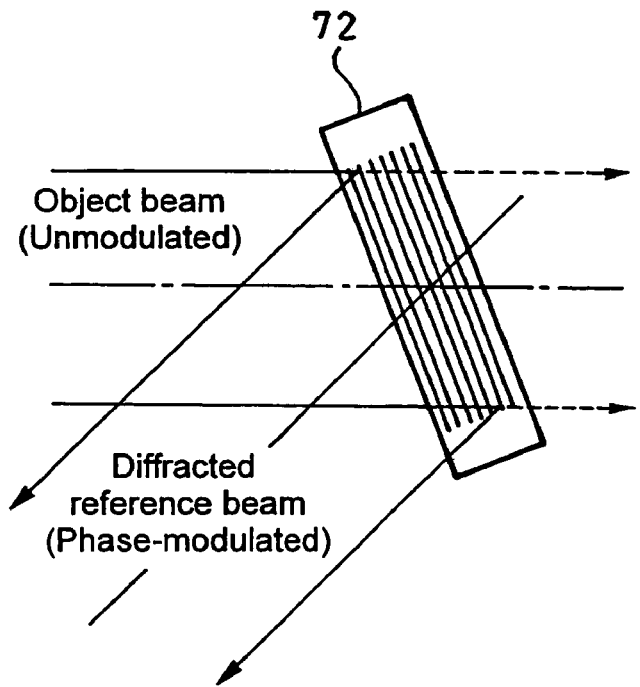
FIG. 9 is a cross-sectional view schematically illustrating the process of obtaining a diffraction beam by projecting the object beam onto the manufactured phase code mask.

Therefore, as shown in FIG. 9, when an unmodulated object beam is incident on a phase code mask 72 in which the phase codes are multiplex-recorded as the interference fringes, a phase-modulated reference beam is emitted as a diffraction beam. Conversely, when a phase-modulated reference beam is projected, an unmodulated object beam is emitted.

The abovementioned phase code mask material 58 shown in FIG. 8 or the abovementioned phase code mask 72 shown in FIG. 9 is a phase reflection type volume hologram, but the present invention is not limited thereto. These may be a transmission type or amplitude type hologram.

However, the phase code mask must be a volume hologram since the phase information of the reference beam is required to be recorded. Further, the thickness of the phase code mask must be at least about ten times the wavelength of the laser beam employed upon recording.

Moreover, in terms of the efficiency of laser beam utilization upon hologram recording, the closer the diffraction efficiency of the phase code mask to 100%, the more preferable. Therefore, the phase type hologram is better than the amplitude type hologram. Among the phase types, a diffraction efficiency of nearly 100% can be obtained in theory for the reflection type and the transmission type. Therefore, either of the reflection type and the transmission type may be employed and is freely selected to fit the optical system design upon hologram recording.

Next, with reference to FIG. 10, a description will be given for the case where angle multiplex recording is performed on the phase code mask. In this case, as a mask driving device, an angle modulator 73 is employed which modulates the angle of the phase code mask material 58 with respect to the reference beam and the object beam.

In FIG. 10(A), when a phase code pattern designated as No. 1 is recorded, the angle between a normal line 59 to the surface of the phase code mask material 58 and an object beam Ob is set to θ1, and exposure is performed such that the photosensitivity of the phase code mask material 58 is not utilized to the full extent.

Subsequently, as shown in FIG. 10(B), the phase code mask material 58 is rotated by means of the angle modulator 73 to set the angle between the abovementioned normal line 59 and the object beam Ob to θ2, whereby the phase code pattern is replaced with a phase code pattern designated as No. 2. The exposure is then performed as above.

In this manner, two holograms containing the phase code patterns No. 1 and No. 2 are angle-multiplex-recorded in the phase code mask material 58, thereby forming a phase code mask 58A shown in FIG. 10(C) or 10(D).

Upon the use of this phase code mask 58A, an unmodulated reference beam (the object beam upon the production of the phase code mask) is incident thereon from the left as shown in FIG. 10(C), whereby the reference beam which is phase-modulated by diffraction through the phase code pattern No. 1 is emitted toward the lower left.

Using this phase-modulated reference beam and by means of, for example, the holographic recording apparatus 10 shown in FIG. 1, the abovementioned reference beam is brought to interference with the object beam in which recording data is modulated by means of the amplitude spatial light modulator 30, thereby performing holographic recording in the holographic recording medium 18.

Next, as shown in FIG. 10(D), the abovementioned phase code mask 58A is rotated to adjust the angle between the normal line 59 and the object beam Ob to θ2 while the unmodulated reference beam is fixed. Then, the reference beam which is phase-modulated through the abovementioned phase code pattern No. 2 is emitted as a diffraction beam.

Therefore, by rotating the phase code mask 58A, the phase code multiplex recording can be performed without using an expensive and large phase spatial light modulator.

Figure 10:
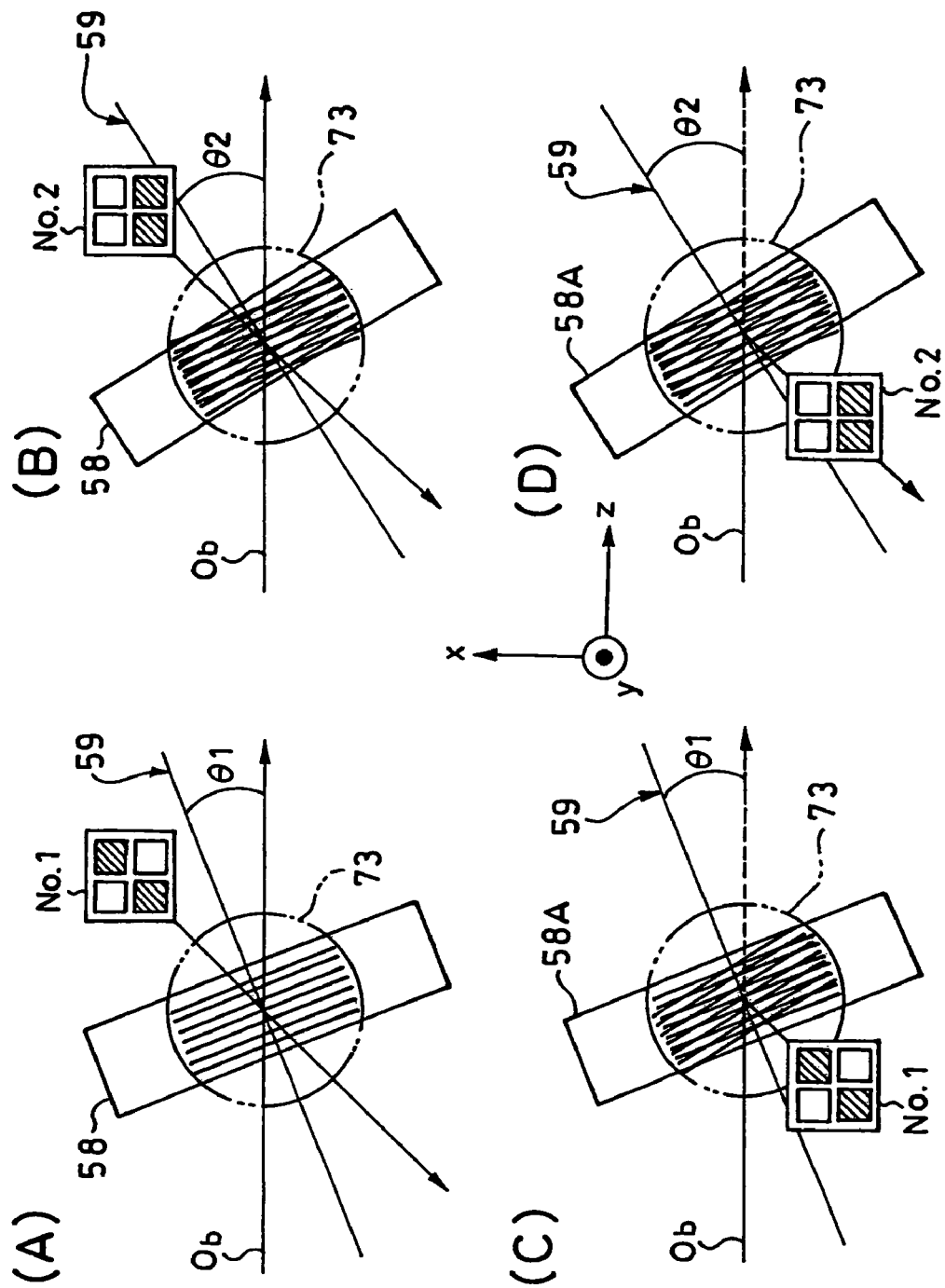
FIG. 10 includes cross-sectional views schematically illustrating the respective states in which angle multiplex recording is performed on the phase code mask and the states in which the reference beam is incident on the angle-multiplex-recorded phase code mask.

In FIG. 10, the description has been made for multiplexing by use of two kinds of phase code patterns for simplifying the description, but its applicability of course extends to the case where the multiplex recording is performed by use of many phase code patterns. However, the larger the number of codes multiplexed in the phase code mask, the lower the diffraction efficiency. Thus, a tradeoff with the data rate of recording or reproducing must be taken into account.

Figure 11:
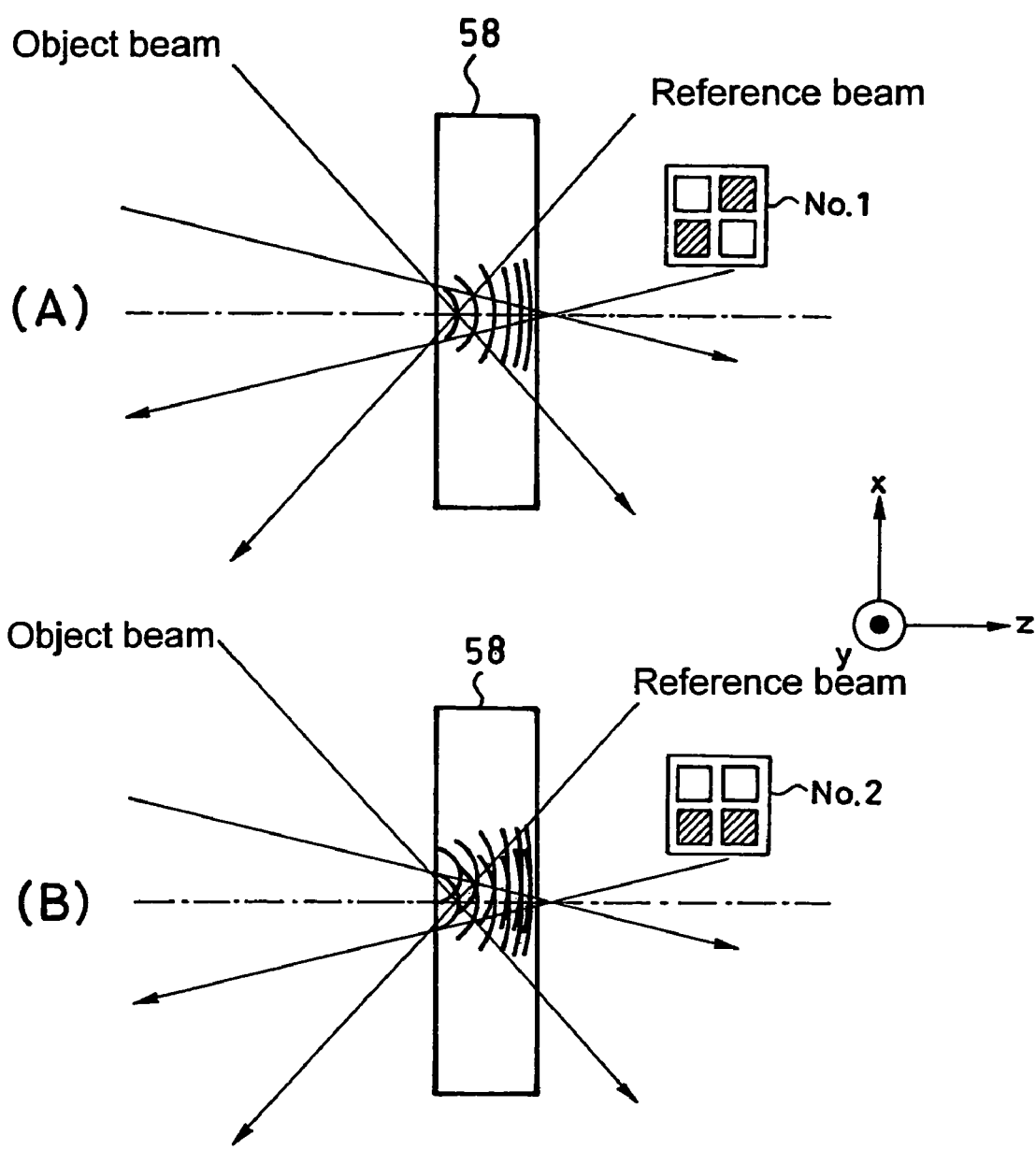
FIG. 11 is a cross-sectional view schematically illustrating the object beam, the reference beam, and the interference fringes when spherical wave shift multiplex recording is performed on a phase code mask.

Next, by use of FIGS. 11 and 12, a description will be given for the case where the phase code patterns are spherical-shift-multiplex-recorded in the phase code mask material.

First, the interference fringes of an unmodulated object beam and a reference beam modulated through a phase code pattern No. 1 shown in FIG. 11(A) are recorded in the phase code mask material 58. At this time, at least one of the reference beam and the object beam is a spherical wave having a nearly spherical wavefront (an equiphase wave surface). For simplifying the description, the incident angles of the reference beam and the object beam with respect to the phase code mask material 58 are the same in the configuration in FIG. 11(A), but different configurations may be employed.

Next, the direction perpendicular to the recording surface of the phase code mask material 58 is defined as a Z-axis, and the direction perpendicular to the plane containing the reference beam and the object beam is defined as a Y-axis. The phase code mask material 58 is translationally moved in the XY plane by means of the translating device 44 in the abovementioned holographic recording apparatus 40 to thereby record a phase code pattern No. 2 shown in FIG. 11(B) by means of an exposure method similar to the above. p If the amount of the translational motion at this time is larger than the value of Δ (see 10 May 1996/Vol. 35, No. 14/APPLIDE OPTICS P2403-2417) which is determined by the thickness of the phase code mask material 58, the spot size and the wavelength of an exposure beam, the NA (numerical aperture), the incident angle, and the like, the selectivity of the hologram functions to thereby allow the two phase code patterns No. 1 and No. 2 to be independently reproduced. Moreover, in the abovementioned X, Y, and Z axes, the amount of the translational motion in the X axis direction (ΔX) is found to be much smaller than that in the Y axis direction (ΔY) and thus can be very small.

Further, the shift direction is not limited to the X axis or Y axis and may be, for example, the direction at θ (0° <θ<90°) from the X axis. In this case, the Δ may be a value between ΔX and ΔY.

Figure 12:
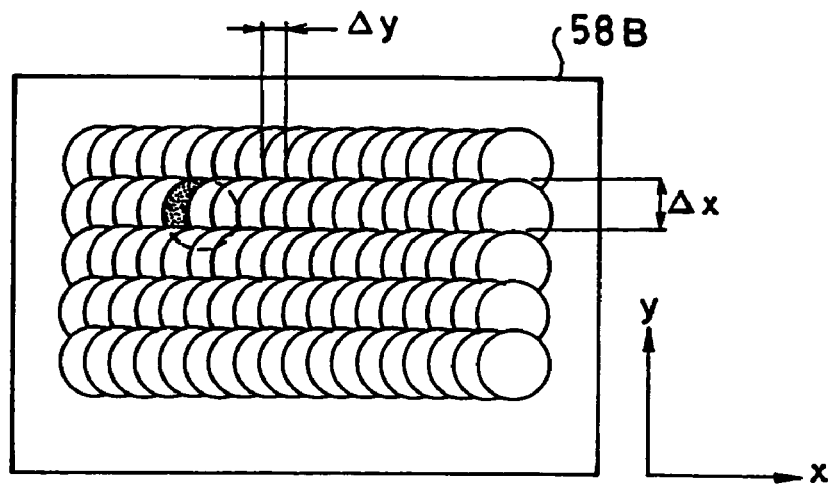
FIG. 12 is a plane view schematically illustrating the phase code mask in which phase codes are multiplex-recorded by means of the spherical wave shift multiplex recording.

When the shift multiplex recording is performed in both the X axis and Y axis directions, a hologram arrangement such as the phase code mask 58B shown in FIG. 12 is obtained.

Here, the size of the phase code mask 58B and the value of the shift amount Δ may be determined based on the design of a recording and reproducing optical system and the total number of required phase code patterns. However, in terms of the diffraction efficiency or the efficiency of recording and reproducing laser beam utilization in a recording and reproducing system, the larger Δ is more preferable.

Third Embodiment

Figure 13:
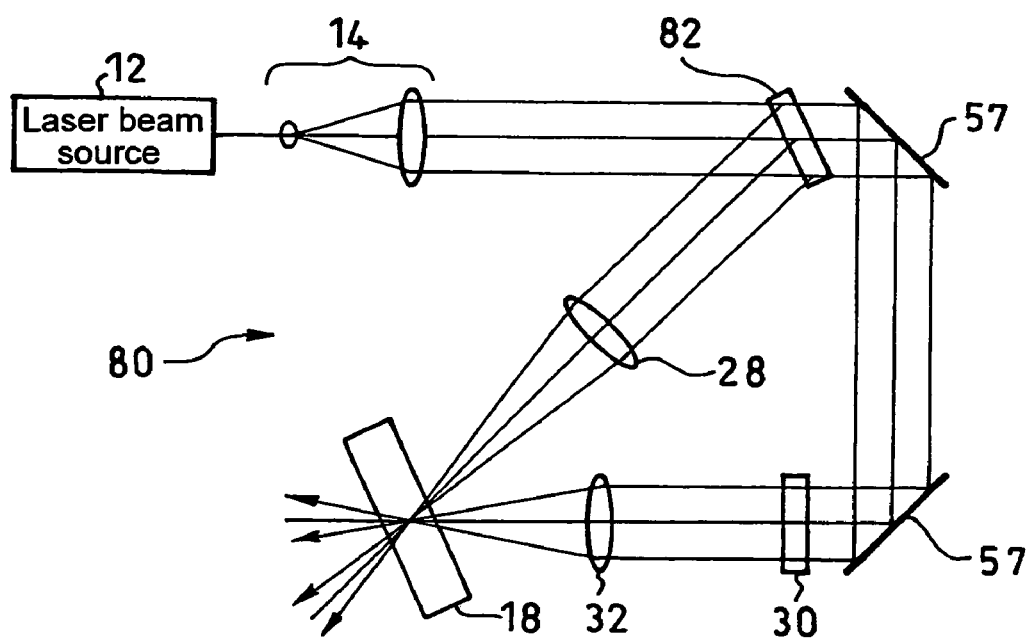
FIG. 13 is an optical system diagram illustrating a holographic recording apparatus according to a third embodiment of the present invention.

Next, a description will be made for a holographic recording apparatus 80 according to a third embodiment shown in FIG. 13.

Among the components of this holographic recording apparatus 80, the same components as those constituting the abovementioned holographic recording apparatus 10 are designated by the same numerals as those in FIG. 1, and the descriptions will be omitted.

In the holographic recording apparatus 80 of Example 3, a transmission type phase code mask 82 is employed. The laser beam from the beam expander 14 is projected thereonto to result in a zeroth-order diffraction beam or a transmission beam serving as the object beam and in a diffraction beam or a reflection beam serving as the reference beam, whereby interference fringes are recorded in the holographic recording medium 18.

Therefore, in the third embodiment, the phase code mask 82 is configured to serve not only as both a phase spatial light modulator and a mirror but also as a polarizing beam splitter. Hence, the number of components can be reduced, and the efficiency of laser beam utilization can be improved.

Particularly, if the number of the phase codes multiplexed in the phase code mask 82 is large, the diffraction efficiency per code or the amount of the reference beam decreases. Therefore, the amount of the transmission beam which is wasted in the holographic recording apparatus 10 of FIG. 1 increases to improve the efficiency of laser beam utilization.

Further, also in this holographic recording apparatus 80, the abovementioned phase code mask 82 may be translationally moved or angle-modulated by means of a mask driving device. In this case, the Fourier lens 28 must be driven synchronously.

Moreover, for example, a grating intensity distribution symmetric with respect to the optical axis may be given to the phase code mask 82 in advance to thereby control the diffraction efficiency by means of the magnification of the beam expander 14.

The invention claimed is:

1. A holographic recording apparatus, comprising: a laser beam source; a reference optical system which guides one of branched laser beams resulting from branching a laser beam from this laser beam source to a holographic recording medium as a reference beam; an object optical system which guides the other of the branched laser beams to the holographic recording medium as an object beam; a phase code mask which is arranged in the reference optical system, has a required phase code pattern recorded as a hologram in advance, and phase-spatial-modulates the reference beam; and an amplitude spatial light modulator which is arranged in the object optical system and amplitude-spatial-modulates the object beam according to information to be recorded, wherein the phase-spatial-modulated reference beam and the amplitude-spatial-modulated object beam are projected onto the holographic recording medium to thereby perform holographic recording of the information, and the phase code pattern is angle-multiplex-recorded in the phase code mask.

2. The holographic recording apparatus according to claim 1, comprising an angle modulator which modulates at least one of an angle of the phase code mask with respect to the laser beam and an incident luminous intensity of the laser beam on the phase code mask.

3. The holographic recording apparatus according to claim 2, comprising a beam expander which expands a beam diameter of the laser beam from the laser beam source, and wherein: the phase code mask serves as means which branches the laser beam having the expanded beam diameter; and a diffraction beam of the laser beam in the phase code mask serves as the reference beam, and a transmission beam thereof serves as the object beam.

4. The holographic recording apparatus according to claim 1, comprising a beam expander which expands a beam diameter of the laser beam from the laser beam source, and wherein: the phase code mask serves as means which branches the laser beam having the expanded beam diameter; and a diffraction beam of the laser beam in the phase code mask serves as the reference beam, and a transmission beam thereof serves as the object beam.

5. A holographic recording apparatus, comprising: a laser beam source; a reference optical system which guides one of branched laser beams resulting from branching a laser beam from this laser beam source to a holographic recording medium as a reference beam; an object optical system which guides the other of the branched laser beams to the holographic recording medium as an object beam; a phase code mask which is arranged in the reference optical system, has a required phase code pattern recorded as a hologram in advance, and phase-spatial-modulates the reference beam; and an amplitude spatial light modulator which is arranged in the object optical system and amplitude-spatial-modulates the object beam according to information to be recorded, wherein the phase-spatial-modulated reference beam and the amplitude-spatial-modulated object beam are projected onto the holographic recording medium to thereby perform holographic recording of the information, and the phase code pattern is spherical-shift-multiplex-recorded in the phase code mask.

6. The holographic recording apparatus according to claim 5, comprising a mask driving device which translationally moves the phase code mask in a direction orthogonal to the incident laser beam.

7. The holographic recording apparatus according to claim 6, comprising a beam expander which expands a beam diameter of the laser beam from the laser beam source, and wherein: the phase code mask serves as means which branches the laser beam having the expanded beam diameter; and a diffraction beam of the laser beam in the phase code mask serves as the reference beam, and a transmission beam thereof serves as the object beam.

8. The holographic recording apparatus according to claim 5, comprising a beam expander which expands a beam diameter of the laser beam from the laser beam source, and wherein: the phase code mask serves as means which branches the laser beam having the expanded beam diameter; and a diffraction beam of the laser beam in the phase code mask serves as the reference beam, and a transmission beam thereof serves as the object beam.

9. A holographic recording apparatus, comprising: a laser beam source; a beam expander which expands a beam diameter of the laser beam from the laser beam source; a phase code mask which has a required phase code pattern recorded as a hologram in advance, phase-spatial-modulates a diffraction beam, serves as means which branches the laser beam having the expanded beam diameter, and the diffraction beam of the laser beam in the phase code mask serves as a reference beam, and a transmission beam thereof serves as an object beam; a reference optical system which guides the reference beam to a holographic recording medium; an object optical system which guides the object beam to the holographic recording medium; and an amplitude spatial light modulator which is arranged in the object optical system and amplitude-spatial-modulates the object beam according to information to be recorded, wherein the phase-spatial-modulated reference beam and the amplitude-spatial-modulated object beam are projected onto the holographic recording medium to thereby perform holographic recording of the information.

10. A holographic reproducing apparatus, comprising: a phase code mask which has a phase code pattern recorded as a hologram and phase-modulates a projected laser beam by use of the phase code pattern; a laser beam source; a beam expander which expands a beam diameter of a laser beam from the laser beam source; a reference optical system which projects the laser beam having the expanded beam diameter onto the phase code mask and guides a diffraction beam thereof to a holographic recording medium; a Fourier lens disposed after the phase code mask in the reference optical system; and a CCD which receives the diffraction beam formed from a reference beam projected onto the holographic recording medium to thereby reproduce information, wherein the information is phase-code-multiplex-recorded in the holographic recording medium in advance so as to correspond to the phase code pattern of the phase code mask; the phase code pattern is multiplex-recorded in the phase code mask and the information is phase-code-multiplex-recorded in the holographic recording medium; and the phase code mask is configured to be controllable by means of a mask driving device such that one of the recorded phase code patterns is recreated.

11. A holographic recording and reproducing apparatus, comprising: a laser beam source; a beam expander which expands a beam diameter of a laser beam from the laser beam source; a polarizing beam splitter which splits the laser beam having the expanded beam diameter into two linearly polarized beams having orthogonal vibration planes; a reference optical system which guides one linearly polarized beam branched by means of the polarizing beam splitter to a holographic recording medium; an object optical system which guides the other linearly polarized beam to the holographic recording medium; a ½ wave plate, a phase code mask, and a Fourier lens which are arranged in the reference optical system in order from the side of the polarizing beam splitter; a mask driving device which drives the phase code mask; and an amplitude spatial light modulator and a Fourier lens which are arranged in the object optical system in order from the side of the polarizing beam splitter, wherein: the phase code mask has the phase code pattern multiplex-recorded as a hologram and is configured to phase-modulate the projected reference beam by means of the phase code pattern; the amplitude spatial light modulator is configured to amplitude-modulate the object beam according to information to be recorded; and the phase-modulated reference beam and the amplitude-modulated object beam are projected onto the holographic recording medium to thereby phase-code-multiplex-record the information through interference fringes of the reference beam and the object beam.

* * * * *